US010027602B2

(12) United States Patent
Srinivasan

(10) Patent No.: US 10,027,602 B2
(45) Date of Patent: Jul. 17, 2018

(54) PACKET QUEUE DEPTH SORTING SCHEME FOR SWITCH FABRIC

(71) Applicant: Oracle International Corporation, Redwood City, CA (US)

(72) Inventor: Arvind Srinivasan, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 495 days.

(21) Appl. No.: 14/445,217

(22) Filed: Jul. 29, 2014

(65) Prior Publication Data

US 2016/0036733 A1 Feb. 4, 2016

(51) Int. Cl.
*H04L 12/935* (2013.01)
*H04L 12/933* (2013.01)
(Continued)

(52) U.S. Cl.
CPC ........ *H04L 49/3018* (2013.01); *H04L 49/101* (2013.01); *H04L 49/254* (2013.01); *H04L 47/6255* (2013.01)

(58) Field of Classification Search
CPC ....... H04L 12/56; H04L 12/931; H04L 12/50; H04L 12/28; H04L 12/42; H04L 12/16; H04L 12/861; H04L 12/863; H04L 12/947; H04L 12/5693; H04L 49/205; H04L 49/45; H04L 49/1507; H04L 49/254; H04L 49/103; H04L 49/1515; H04L 49/3027; H04L 49/255; H04L 49/25; H04L 49/90; H04L 49/15; H04L 49/3018; H04L 49/3081; H04L 49/506; H04L 49/201; H04L 49/203; H04L 49/901; H04L 49/108; H04L 49/3045; H04L 49/101; H04L 29/06; H04L 13/08; H04L 2012/5682; H04L 2012/5651; H04L 2012/5637; H04L 2012/5649; H04L 2012/563; H04L 2012/5647; H04L 2012/5681; H04L 2012/5697; H04L 47/6255; H04L 47/621; H04L 47/522
(Continued)

(56) References Cited

U.S. PATENT DOCUMENTS 5,475,680 A * 12/1995 Turner .................. H04L 49/103
370/412
6,259,698 B1 * 7/2001 Shin ........................ H04L 29/06
370/235
(Continued)

*Primary Examiner* — Andrew Chriss
*Assistant Examiner* — Rasha Fayed
(74) *Attorney, Agent, or Firm* — Polsinelli PC

(57) ABSTRACT

Implementations of the present disclosure involve an apparatus and/or method for an efficient packet queue depth sorting scheme for a 'longest queue first' based switch fabric device. In general, the sorting scheme compares a data queue length on an incoming port to a sorted queue of available ports based on longest queue. Based at least on the results of the comparison of the data queue length on the input port, a port designator is inserted into a re-sorted longest queue available port list in the proper position based on the incoming or outgoing port data length. The remaining entries are then sorted around the inserted port designator. Because the comparison and insertion of the port designator can occur in one clock cycle of the switch fabric device, efficiency of the switch is improved.

20 Claims, 6 Drawing Sheets

(51) Int. Cl.
*H04L 12/937* (2013.01)
*H04L 12/863* (2013.01)

(58) Field of Classification Search
USPC ....... 370/357, 359, 366, 412, 413, 411, 422, 370/235, 395.7, 432
See application file for complete search history.

(56) References Cited

U.S. PATENT DOCUMENTS

| | | | |
|---|---|---|---|
| 6,553,031 B1* | 4/2003 | Nakamura | H04L 45/54 370/359 |
| 6,915,372 B2* | 7/2005 | Magill | H04L 12/5601 710/317 |
| 7,251,242 B2* | 7/2007 | Schrodi | H04L 12/5601 370/235 |
| 2002/0110086 A1* | 8/2002 | Reches | H04L 47/6215 370/235 |
| 2006/0062231 A1* | 3/2006 | Bianco | H04L 49/3045 370/412 |
| 2010/0182920 A1* | 7/2010 | Matsuoka | H04L 43/00 370/252 |
| 2014/0317333 A1* | 10/2014 | Dorst | G06F 13/28 710/308 |

* cited by examiner

PACKET QUEUE DEPTH SORTING SCHEME FOR SWITCH FABRIC

FIELD OF THE DISCLOSURE

Aspects of the present invention relate to switched fabric computer network devices and, more particularly, aspects of the present invention involve an efficient packet queue depth sorting scheme for a 'longest queue first' based switch fabric device.

BACKGROUND

High performance network fabric switches are utilized in networking environment to provide switching functionality for high performance computing and/or enterprise data centers. One type of such a high performance fabric switch is an Infiniband network fabric switch. For example, an Infiniband fabric switch may provide up to 100 Gigabit per second (Gbps) switching on 42 input/output ports. The fabric switch provides switching capabilities to a network to spread traffic on the network across multiple physical links between the components of the network.

The performance of an Infiniband switch may depend on the switching efficiency of the switch and the arbitration time required to switch between ports. In general, the faster that the fabric switch reliably processes the data received at the switch, the higher performance of the switch. One scheme developed to improve the efficiency of the switch is to serve those input ports that have the longest queue (or higher port occupancy). Better efficiency of the fabric switch is guaranteed if the queue with a higher occupancy is served first by a particular output port.

To find the highest occupancy among all of the participating queues in a high throughput and low latency fabric switch, the queue depths associated with an output port is sorted through one or more hardware components. The time taken to sort the queues directly affects the switching efficiency of the fabric switch. It also adds to the latency since during the sorting process, the output port is idle. Thus, a faster sorting scheme generally improves the overall efficiency of the fabric switch.

It is with these and other issues in mind that various aspects of the present disclosure were developed.

SUMMARY

One implementation of the present disclosure may take the form of a method for operating a switch fabric of a network. The method may include the operations of maintaining an ordered list of a plurality of input ports of a switch, the list of input ports of the switch ordered based on at least a data queued length to be transmitted out an output port of the switch for each input port, the ordered list comprising an identifier of each of the plurality of input ports and an associated data queued length for each of the plurality of input ports and comparing an adjusted data queued length of an active input port of the plurality of input ports to each associated data queued length of the plurality of input ports maintained in the ordered list. In addition, the operations of inserting an updated identifier of the active input port of the plurality of input ports into the ordered list based at least on the comparison of the adjusted data queued length of the active input port to each associated data queued length of the plurality of input ports maintained in the ordered list and re-sorting an updated identifier of at least one of the input ports of the plurality of input ports of the switch in the ordered list based at least on the insertion of the updated identifier of the active input port of the plurality of input ports into the ordered list may also be included.

Another implementation of the present disclosure may take the form of a network fabric switch. The network fabric switch may comprise a plurality of input/output (I/O) ports, each I/O port configured receive data packets from a network and transmit data packets to the network and a fabric switch controller. The controller is configured to, among other tasks, maintain an ordered list of the plurality of I/O ports, the list of I/O ports ordered based on, for each I/O port, at least a data queued length to be transmitted out one of an output port of the switch, the ordered list comprising an identifier of each of the plurality of I/O ports and an associated data queued length for each of the plurality of I/O ports and compare an adjusted data queued length of an active I/O port of the plurality of I/O ports to each associated data queued length of the plurality of I/O ports maintained in the ordered list. The controller also inserts an updated identifier of the active I/O port of the plurality of I/O ports into the ordered list based at least on the comparison of the adjusted data queued length of the active I/O port to each associated data queued length of the plurality of I/O ports maintained in the ordered list and re-sorts an updated identifier of at least one of the I/O ports of the plurality of I/O ports of the switch in the ordered list based at least on the insertion of the updated identifier of the active I/O port of the plurality of I/O ports into the ordered list.

Yet another implementation of the present disclosure may take the form of a networking component. The component may include a plurality of ports, each port configured receive data packets from a network and transmit data packets to the network, a processor, and a computer-readable medium associated with the processor. The computer-readable medium includes instructions stored thereon and executable by the processor to cause the processor to maintain an ordered list of a plurality of input ports of the component, the list of input ports of the component ordered based on at least a data queued length to be transmitted out an output port of the component for each input port, the ordered list comprising an identifier of each of the plurality of input ports and an associated data queued length for each of the plurality of input ports and compare an adjusted data queued length of an active input port of the plurality of input ports to each associated data queued length of the plurality of input ports maintained in the ordered list. The instructions also cause the processor to insert an updated identifier of the active input port of the plurality of input ports into the ordered list based at least on the comparison of the adjusted data queued length of the active input port to each associated data queued length of the plurality of input ports maintained in the ordered list and re-sort an updated identifier of at least one of the input ports of the plurality of input ports of the switch in the ordered list based at least on the insertion of the updated identifier of the active input port of the plurality of input ports into the ordered list.

DETAILED DESCRIPTION

Implementations of the present disclosure involve an apparatus, device, component, and/or method for an efficient packet queue depth sorting scheme for a 'longest queue first' based switch fabric device. In general, the sorting scheme compares a data queue length on an input port to a sorted queue of available ports based on longest queue. Based at least on the results of the comparison of the data queue length on the input port, a port designator is inserted into a re-sorted longest queue available port list in the proper position based on the input port data length. The remaining entries are then sorted around the inserted port designator. In particular, the remaining entries in the sorted longest queue list are re-sorted around the inserted port designator by either moving up one position in the re-sorted list, down one position in the re-sorted list, or remaining in the same position in the re-sorted list. Because the comparison and insertion of the port designator can occur in one clock cycle of the switch fabric device, efficiency of the switch is improved. Further, because the movement of the port designators in the sorted list are moved in one of three positions based on the previous list position (up one position, down one position, or stay the same), the hardware and/or software to facilitate the re-sorting is minimized to perform such sorting in one clock cycle. As such, efficiency of the switch is improved with a small hardware footprint within the device.

Figure 1:
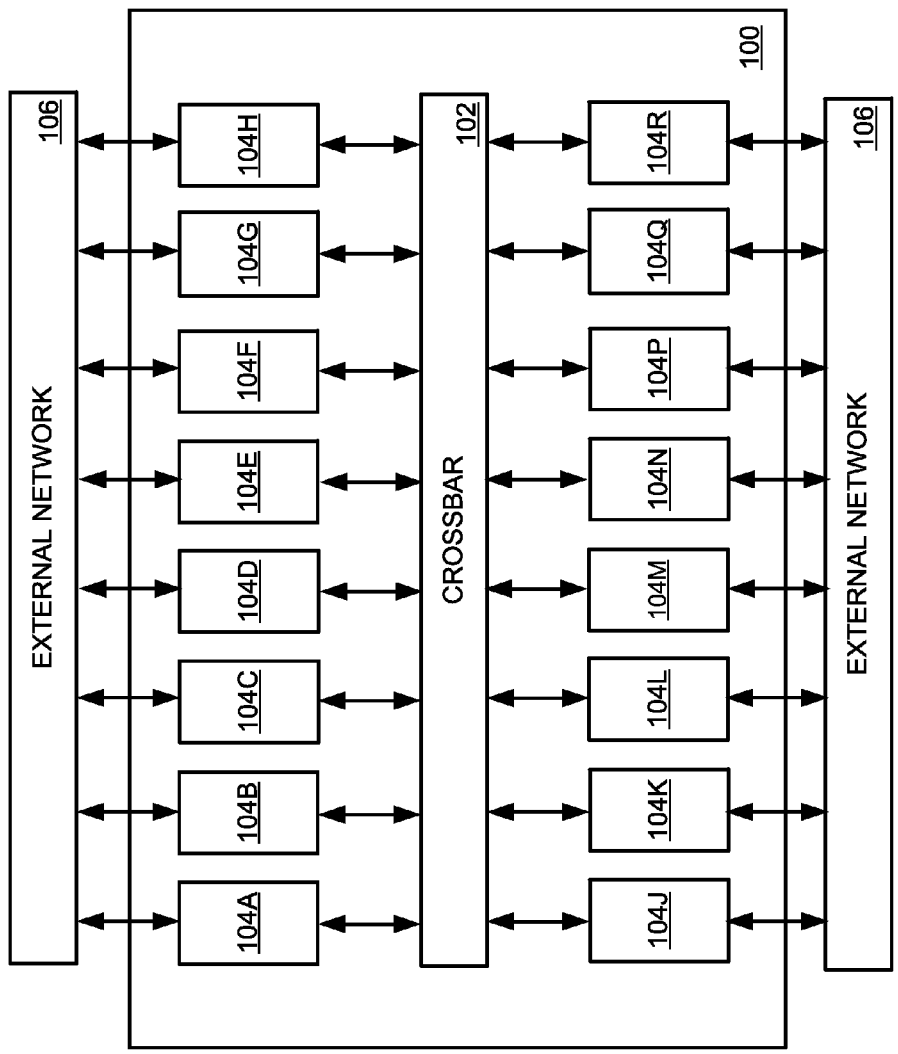
FIG. 1 is a circuit diagram illustrating an example of a network fabric switch.

FIG. 1 is a circuit diagram illustrating an example of a network fabric switch 100. As described above, a network fabric switch 100 provides switching capabilities in networking environments, such as computing networks and/or enterprise data centers. In particular, the switch 100 may include any number of input/output ports 104A-R that receive data from an external source 106 and/or transmit received data to the external source. The switch 100 illustrated in FIG. 1 includes 16 such ports 104A-R. However, the switch 100 may include any number of I/O ports. As mentioned, the external sources or network 106 provide data in one or more packets to the switch 100 for transmission to other components in the network. The data is transmitted through the ports 104A-R of the switch. Once a packet is received on one of the ports 104A-R, the packet may then be transmitted across the crossbar 102 of the switch 100 to any other I/O port for transmission out to the network 106. In this manner, data packets are received at the switch 100 from the network 106, transmitted to any other port 104A-R of the switch, and sent out to another portion or component of the network.

In one particular example, the switch 100 is an Infiniband-type fabric switch. In other words, the switch 100 operates on the Infiniband standard for fabric switches. As mentioned above, the switch 100 may include any number of I/O ports 104A-R. In the Infiniband example above, the switch 100 includes 42 such ports and is capable of switching up to 100 Gbps of data rate per port. However, the details of the present disclosure may apply to any type of switch or fabric switch that utilizes a longest queue first output transmission scheme, as explained in more detail below.

In some types of fabric switches, the switch 100 may also include one or more virtual lanes associated with each or some of the ports 104A-R. A virtual lane is a method by which an output port 104A-R of the switch 100 can apply one or more priorities on transmission of data through the port. For example, a port 104A-R of the switch 100 may include 16 virtual lanes, with each virtual lane apply a policy (such as a priority) to each virtual lane. Thus, the total virtual output complexity of the switch 100 includes the number of total ports in the switch multiplied by the number of virtual lanes created for each port. As should thus be appreciated, the total output complexity of the switch 100 can be quite complicated.

One method that has been adopted in many fabric switch architectures to improve the efficiency of the switch is known as "longest queue first" approach. In general, any port 104A-R of the switch 100 may transmit data packets received on any other port of the switch. To determine which port is serviced first (which port gets the data packets received on that port transmitted through the output port), the output port may determine which port has the longest queue. In one example, the longest queue is determined by the bytes of data waiting to be transmitted through the output port. Thus, the output port determines which input port has the most bytes of data waiting to be transmitted through the output port. To determine which port has the longest queue, each port may maintain a sorted list of input ports. The list may be sorted based on the queue length for each input port. For example, output port five of the switch may maintain a list of the other ports of the switch, sorted by queue length. When the output port is ready to transmit a data packet, data packets from the input port at the top of the sorted list (the input port with the longest queue length based on bytes of data) are transmitted through the port first, followed by the input port with the second longest queue length, and so on. In this manner, the output port may attempt to address the longest queue length when transmitting data to increase the efficiency of the switch.

As mentioned, each port of the switch may maintain the sorted list based on the queue length of the input port. Further, this maintained list may be periodically updated to reflect changes in the queue length of the input ports in the list. Previous methods to update or re-sort the sorted list can either take too long (more than one clock cycle) or require complex hardware solutions at the cost of valuable silicon area and power. Methods that take more than one clock cycle may sort an incorrect queue length for an input port as the input port may receive additional data packets at each clock cycle. Methods that require large hardware circuits to re-sort the list take up space within the switch and power of the switch that could be applied to making the switch more efficient and/or faster.

Figure 2:
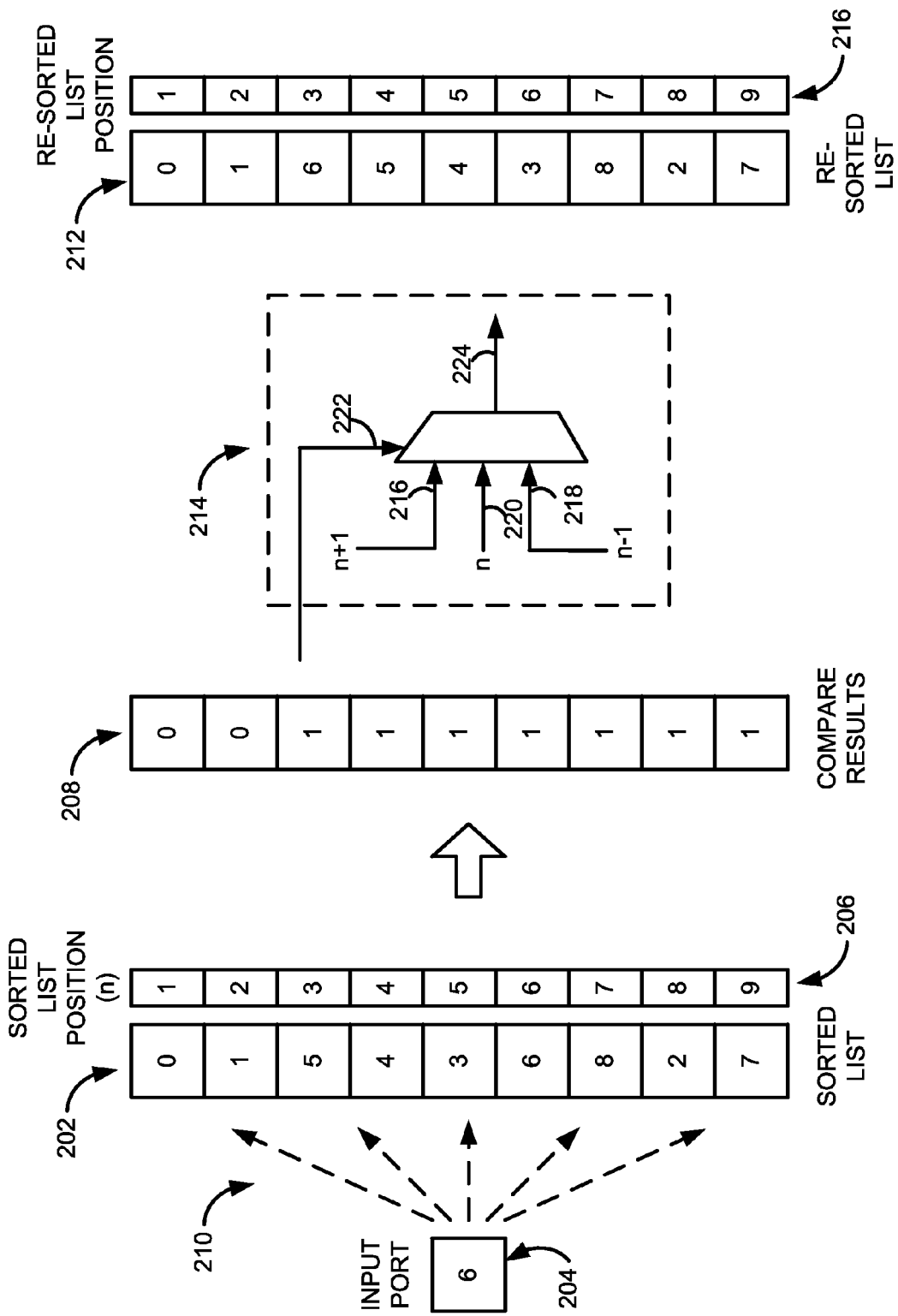
FIG. 2 is a block diagram illustrating a sorting scheme for longest queue of input data to a network fabric switch.

An alternative approach to maintaining and updating a sorted list based on the queue length of the input ports is discussed and illustrated below. In particular, FIG. 2 is a block diagram illustrating a sorting scheme for longest queue of input data to a network fabric switch. In particular, the sorting scheme illustrated in FIG. 2 is for one virtual lane of a fabric switch. In one embodiment of the fabric switch, each virtual lane of each port in the switch may utilize the sorting scheme described below to maintain and update the sorted list of longest queue length of input ports transmitting data packets through the virtual lane. However, it is not required that every virtual lane of the fabric switch utilize the sorting scheme described herein.

Figure 3:
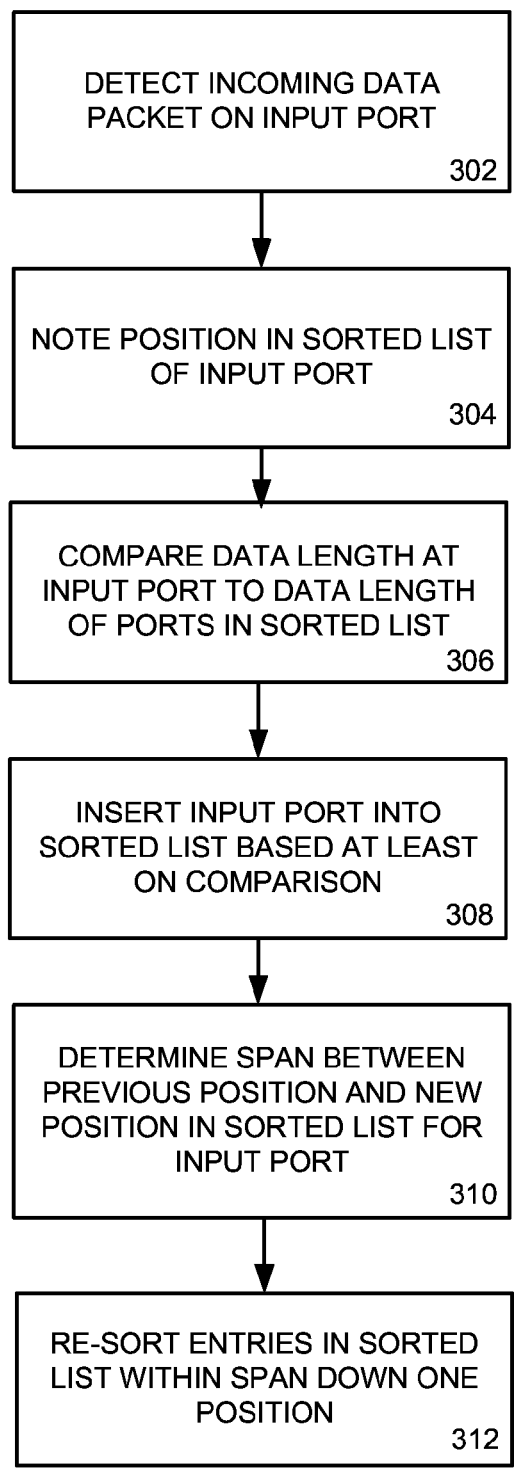
FIG. 3 is a flowchart of a method for a sorting scheme for longest queue of input data to a network fabric switch.

The sorting scheme illustrated in FIG. 2 may be understood through the operations illustrated in the flowchart in FIG. 3. FIG. 3, in particular, is a flowchart of a method the switch may perform for a virtual lane to re-sort a longest queue sorted list based on a received data packet at an input port. The operations of FIG. 3 may be performed by a network fabric switch, such as that illustrated in FIG. 1. In particular, the operations may be performed through hardware, software or a combination of hardware and software of the switch. Particular hardware and/or software components of the switch utilized to perform one or more of the operations of the method of FIG. 3 are discussed in more detail below.

As described above, one or more of the virtual lanes of the switch may employ a longest queue first approach to determine which data packet is transmitted through the available output port. In other words, the virtual lane may maintain a sorted list of all ports requesting to transmit data through the output port and the data lengths of those ports indicating the number of data packets from each input port. The sorting scheme discussed herein assumes such a sorted list is maintained for the particular virtual lane. One example of such a sorted list 202 is illustrated in FIG. 2. The particular example sorted list 202 of FIG. 2 provides a longest queue list for nine input ports, indicated as ports 0-9. As such, the sorted list 202 may be for a ten port switch (as a data packet arriving on a port cannot be output on the same port). Although the example provided in FIG. 2 is for a ten port switch, it should be appreciated that any number of I/O ports may be associated with a switch and the sorting scheme discussed herein is not limited to any number of such ports.

The sorted list for the virtual lane of the output port may also be updated as more data packets are received by the switch for transmission out through the output port. Thus, in operation 302 of FIG. 3, the switch detects that a new data packet has been received at an input port of the switch for transmission through the particular output port. The switch also detects which input port the data packet was received. As illustrated in FIG. 2, a new data packet is received at input port six 204. Because input port six has received one or more additional data packets in this example, the data length queue for port six is longer than the position of port six in the sorted list 202. Thus, the sorted list 202 should be re-sorted to reflect the new data length queue for input port six.

Returning to FIG. 3, the switch may determine the current list position of the port on which new data packets have been received in operation 304. The position of the ports in the sorted list 202 is illustrated in FIG. 2 in the sorted list position column 206. The sorted list position column 206 indicates the position within the sorted list 202 of all of the input ports represented in the sorted list, starting from the top position (one) to the bottom position (nine). However, it is not necessary that the switch maintain a separate column for the sorted list position of the input ports in the sorted list. Rather, the entries in the sorted list 202 may maintain an indication of the relative position within overall sorted list for each particular input port. As should be appreciated, the top position in the sorted list 202 indicates that the port in that position has the longest data length queue for transmission through the output port. Conversely, the bottom position in the sorted list 202 indicates that the port in that position has the shortest data length queue for transmission through the output port. In the example shown, input port zero has the longest data queue length for output and input port seven has the shortest data queue length. Returning to operation 304, the switch may determine that new data is received at input port six and that input port six is in the sixth position in the sorted list 202 (as indicated in the sorted list position column 206).

In operation 306, the switch begins re-sorting the sorted list 202 in response to the newly arrived data packet by comparing the data length queue for the port on which the packet arrived (port six 204) to the data length queues of each port in the sorted list. The comparison of the data queue lengths is illustrated in FIG. 2 by the dashed arrows 210 from the input port 204 to the sorted list 202. In one embodiment, the comparison of the data length queue of input port six to the input ports of the sorted list 202 may be completed through a simple comparison circuit that provides a low value (digital "zero") if the input port data queue length 204 is less than the data queue length of the port in the sorted list. Otherwise, if the input port data queue length 204 is greater than the data queue length of the port in the sorted list 202, the comparison circuit provides a high value (digital "one"). Although this particular embodiment is used throughout the present disclosure, any type of comparison of the data queue lengths may occur that determines which ports in the sorted list 202 have a longer data queue length than the data queue length of the input port 204. The results of the comparison are illustrated in FIG. 2 in the comparison results column.

In one embodiment, the switch may include several comparator circuits to compare the data queue length of the input port 204 to each port in the sorted list 202 in a parallel manner. Thus, a comparison circuit may be available for each port in the sorted list 202 such that the comparison may occur simultaneously to each port and within a single clock cycle of the switch. In another embodiment, the comparison 210 may occur through one or more software programs or functions executed by the switch.

As indicated in the comparison result column 208, the relative position within the sorted list based on the input ports 206 longer data queue length may be determined. In particular, the transition within the comparison results 208 from a low value to a high value (or high value to a low value in other embodiments) indicates the sorted list position in which the input port 204 should now be located. In the particular example of FIG. 2, sorted list position one and two returned a low value result in the comparison. Thus, the data length queue of the input port six 204 remains shorter than the data length queue of port zero and port one. However, sorted list positions three through nine returned a high value as a result of the comparison. The high value result indicates the input port six 204 data queue length (with the newly received data packet) is longer than the data queue length of ports two through eight (in sorted list positions 206 three through nine). With this information, the switch may begin re-sorting the sorted list to account for the newly arrived data packet at the input port 204 so that the data queue length sorted list is accurate.

In operation 308, the input port 204 is inserted into the re-sorted list 212 based at least on the data queue length determined above. To insert the input port 204 into the re-sorted list 212 of data queue length, a plurality of three-input mux 214 components may be utilized by the switch. In particular, each entry in the sorted list 202 is moved within the sorted list up one position, down one position, or remains in the same position in response to the insertion of the input port 204 into the sorted list. Thus, as shown in FIG. 2, the inputs to the three-input mux 214 are an n+1 input 216 representing the n position of a particular port in the sorted list moving up one position, an n−1 input 218 representing the n position of a particular port in the sorted list moving down one position, and an n input 220 representing the n position of a particular port in the sorted list remaining in the same position. The output 224 of the mux 214 determines the position of a particular port in the re-sorted list 212 for each of the ports in the list. Thus, although only a single mux 214 is illustrated in FIG. 2, in one embodiment of the present disclosure each port or position within the re-sorted list 212 has an associated mux 214 that determines the position of the particular port in the re-sorted list. The single mux 214 is illustrated in FIG. 2 for illustrative purposes.

In one embodiment, the result of the compare operation 222 described above determines which of the three inputs to the mux 214 is selected by the mux for at least one of the port positions in the re-sorted list 212. In particular and explained in more detail below, the positions within the re-sorted list 212 that are within the span between the position of the input port 204 representation in the sorted list 202 and the position of the input port representation in the re-sorted list 212 are moved either up one position or down one position. Those positions within the re-sorted list 212 that are outside the span remain in the same position from the sorted list 202 to the re-sorted list.

Returning to the method of FIG. 3, the switch may determine the span between the position of the input port 204 representation in the sorted list 202 and the position of the input port representation in the re-sorted list 212 in operation 310. Utilizing the example illustrated in FIG. 2, input port 204 designated input port six is in position six in the sorted list and is inserted into position three in the re-sorted list (as indicated by the re-sorted list position column 216). Thus, the span determined by the switch is between position six and position three.

With this information, the switch can create the re-sorted list 212 for the virtual lane of the output port. In particular, those ports in the sorted list 202 that are outside the determined span (position six and position three in this example) remain in the same position. Thus, port zero remains in the first position and port one remains in the second position in the re-sorted list 212. In addition, port eight remains in position seven, port two remains in position eight, and port seven remains in position nine. In other words, the switch can ignore re-sorting these positions within the re-sorted list 212, thereby simplifying the re-sorting process. In the embodiment that utilizes the mux 214 structure, an selection input 222 may be provided to the mux associated with the positions within the re-sorted list 212 to cause the mux to select the n input 220 such that the output 224 of the mux is the n value, or the same n position for the particular port in the sorted list 202.

In operation 310, the switch re-sorts those ports in the positions within the determined span down one position. Thus, in the example shown, port five is re-sorted down from position three to position four in the re-sorted list 212. Similarly, port four is re-sorted down from position four to position five and port three is re-sorted down from position five to position six. In other words, only those ports within positions within the span between the adjusted input port 204 in the respective lists are moved and by only one position, further simplifying the re-sorting process. In the embodiment that utilizes the mux 214 structure, an selection input 222 may be provided to the mux associated with the positions within the re-sorted list 212 to cause the mux to select the n−1 input 218 such that the output 224 of the mux is the n−1 value, or one position down for the particular port in the sorted list 202. In one embodiment, this selection input 222 may be the results of the comparison 208.

Through the method outlined in FIG. 3, the switch can quickly and efficiently re-sort a sorted data queue length queue list based on the arrival of a new data packet on one of the input ports. Further, the method may be accomplished within one clock cycle of the switch with minimal hardware cost to the switch. Using the example of FIG. 2, a new data packet arrives on input port six 204. As such, the sorted list 202 maintained for the virtual lane output port may be re-sorted to account for the new data queue length at input port six. The switch may first determine the current position within the sorted list 202 of the input port (in this case, position six). Next, the switch may compare the data queue length for input port six 204 to the data queue lengths of the other input ports in the sorted list 202. A resulting comparison column 208 indicates where the input port 204 should be inserted into the re-sorted list 212. The insertion position of the input port 204 in the re-sorted list 212 may also be noted and a span in which the input port moves between the sorted list 202 and the re-sorted list may be calculated. In this example, the insertion position is position three and the span (position six to position three such that the span includes position four through position six as the input port is inserted into position three is calculated. With this information, the re-sorted list 212 may be generated for the virtual lane by the switch. In particular, the ports in positions outside the determined span remain in the same position between the sorted list 202 and the re-sorted list 212. In one example, a mux 214 is utilized to select the input to remain the ports in the same positions within the lists. The ports in positions within the span (position six to position four) are moved down one position to accommodate the insertion of the input port 204 into the re-sorted list 212. Again, a mux 214 is utilized to select the input to move one position down from the positions of the ports within the sorted list 202.

Figure 4:
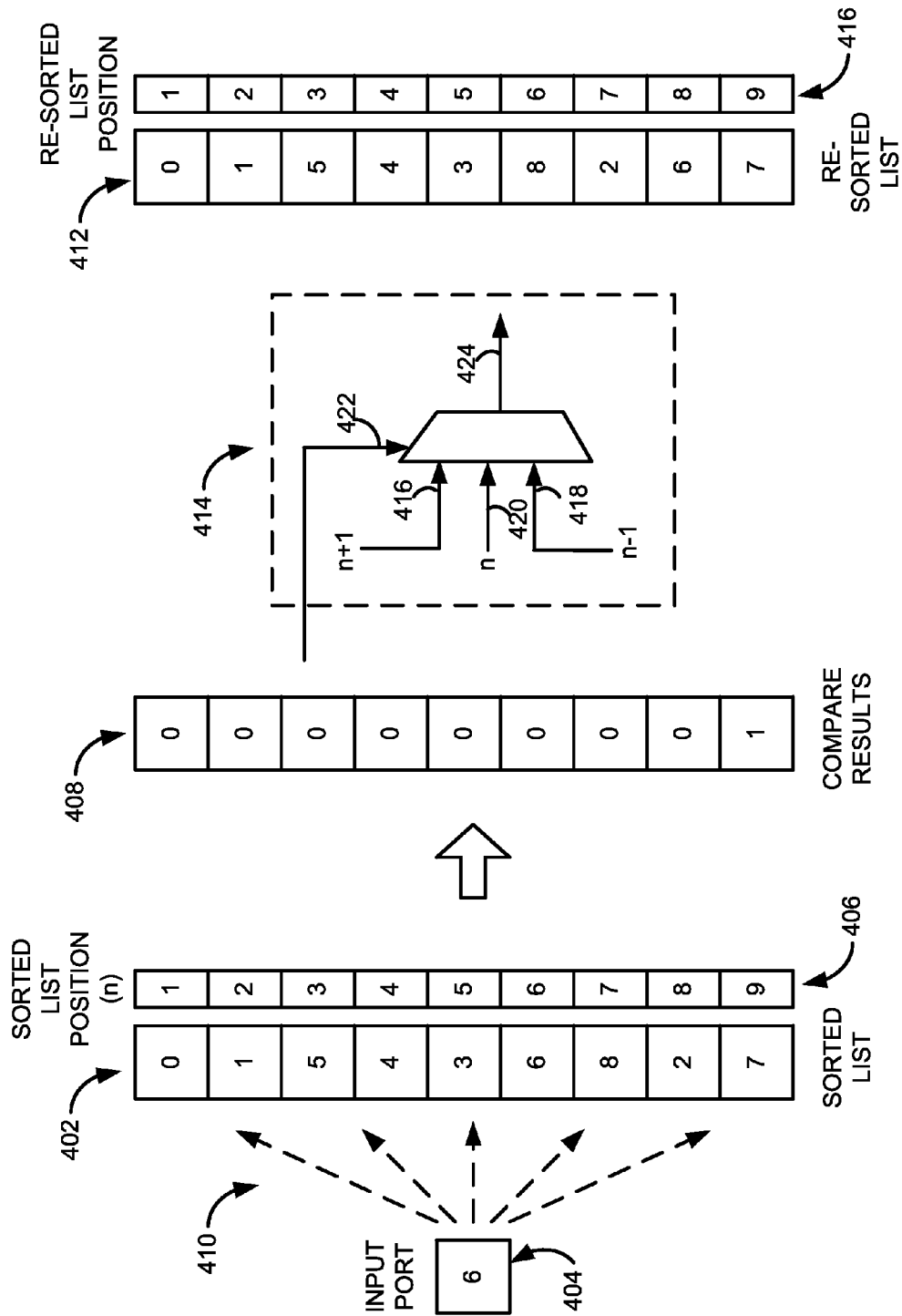
FIG. 4 is a block diagram illustrating a sorting scheme for longest queue of output data of a network fabric switch.
Figure 5:
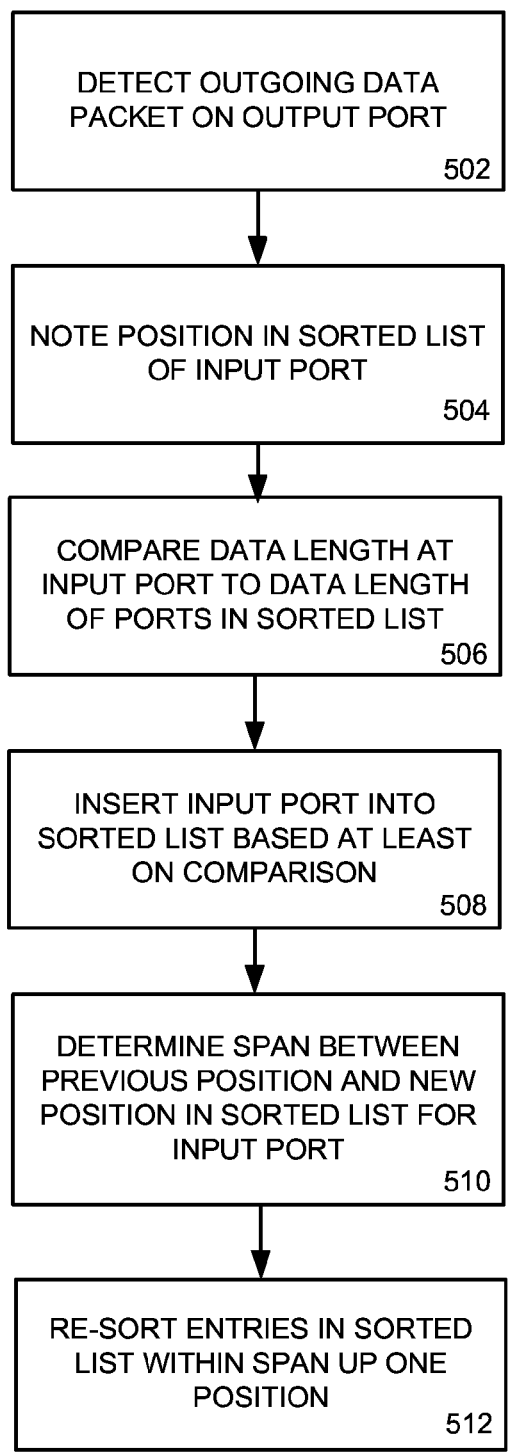
FIG. 5 is a flowchart of a method for a sorting scheme for longest queue of output data of a network fabric switch.

A similar method may also be employed for situation of the output port transmitting data packets. As should be appreciated, transmission of data packets from an input port queue out of the output port would reduce the data queue length for that particular port. As such, a re-sorted list of longest data queue length may reflect the transmission of data packets out of the output port. Thus, similar to the illustrations of FIG. 2 and FIG. 3, FIG. 4 illustrates a block diagram illustrating a sorting scheme for longest queue sorted list in response to the output of data packets and FIG. 5 is a flowchart of a method for a sorting scheme for longest queue sorted list in response to the output of data packets. The operations of the scheme of FIGS. 4 and 5 is similar to that described above, except the queue length for the input port is reduced such that the port would be lower in the re-sorted longest queue length list.

The illustration of FIG. 4 utilizes the same structures and columns as discussed above with reference to FIG. 2. Thus, numerical identifiers in FIG. 2 have similar identifiers in FIG. 4. For example, the sorted list of the virtual lane of the output port is numbered 202 in FIGS. 2 and 402 in FIG. 4 to indicate it is the same or similar sorted list. In this embodiment, however, the data queue length of input port six 404 is reduced as data packets are transmitted on the output port. Similarly, the method of FIG. 5 is similar to the method described above with reference to FIG. 3 and includes the same or similar operations. As such, similar operations have similar numerical identifiers.

As mentioned, the illustrations of FIG. 4 and FIG. 5 address the case when the data queue length of an input is reduced. In the example shown, the output port may transmit one or more data packets from input port six 404, triggering a re-sorting of the sorted list 402 maintained for the virtual lane. Thus, in operation 502, the outgoing data packet is detected by the switch and, in operation 504, the position in the sorted list 402 of the input port 406 affected by the output transmission is noted (in this example, position six in the sorted list). In addition and in a similar manner as described above, the data queue length of the input port 404 may be compared to each port in the sorted list 402 in operation 506. A resulting comparison column 408 indicates where the input port 404 should be inserted into the re-sorted list 412 in operation 508. The insertion position of the input port 404 in the re-sorted list 412 may also be noted by the switch.

As should be appreciated, by reducing the data queue length at the input port 404, the position of the port in the re-sorted list 412 should be lower than the position in the sorted list 402. This is reflected in the comparison results column 408 of FIG. 4. As shown, the transition from low output value to high output value occurs below the position of input port six in the sorted list 402. Thus, input port six 404 is inserted in a position (position eight) the re-sorted list 412 below the position (position six) in the sorted list 402. This span between the position in the sorted list 402 and the re-sorted list 412 for the input port 404 may be determined by the switch in operation 510, as described above.

With this information, the re-sorted list 412 may be generated for the virtual lane by the switch. In particular, the ports in positions outside the determined span remain in the same position between the sorted list 402 and the re-sorted list 412. In the example shown, ports in positions one through five and the port in position nine remain in the same position between the lists. In one embodiment, a mux 414 is utilized to select the input 420 to maintain the ports in the same positions within the lists. The ports in positions within the span (position six to position seven) are moved up one position to accommodate the insertion of the input port 404 into the re-sorted list 412 in position eight in operation 512. Again, the mux 414 is utilized to select the input 416 to move one position up from the positions of the ports within the sorted list 402 to accommodate the insertion of the port into the re-sorted list 412.

As such, the switch may perform a similar operation whether a new data packet is received or a data packet is transmitted through the output port. Through the methods outlined above, the switch can quickly and efficiently re-sort a sorted data queue length queue list based on the arrival or output of a data packet at one of the input ports. Further, the methods may be accomplished within one clock cycle of the switch with minimal hardware cost to the switch.

Figure 6:
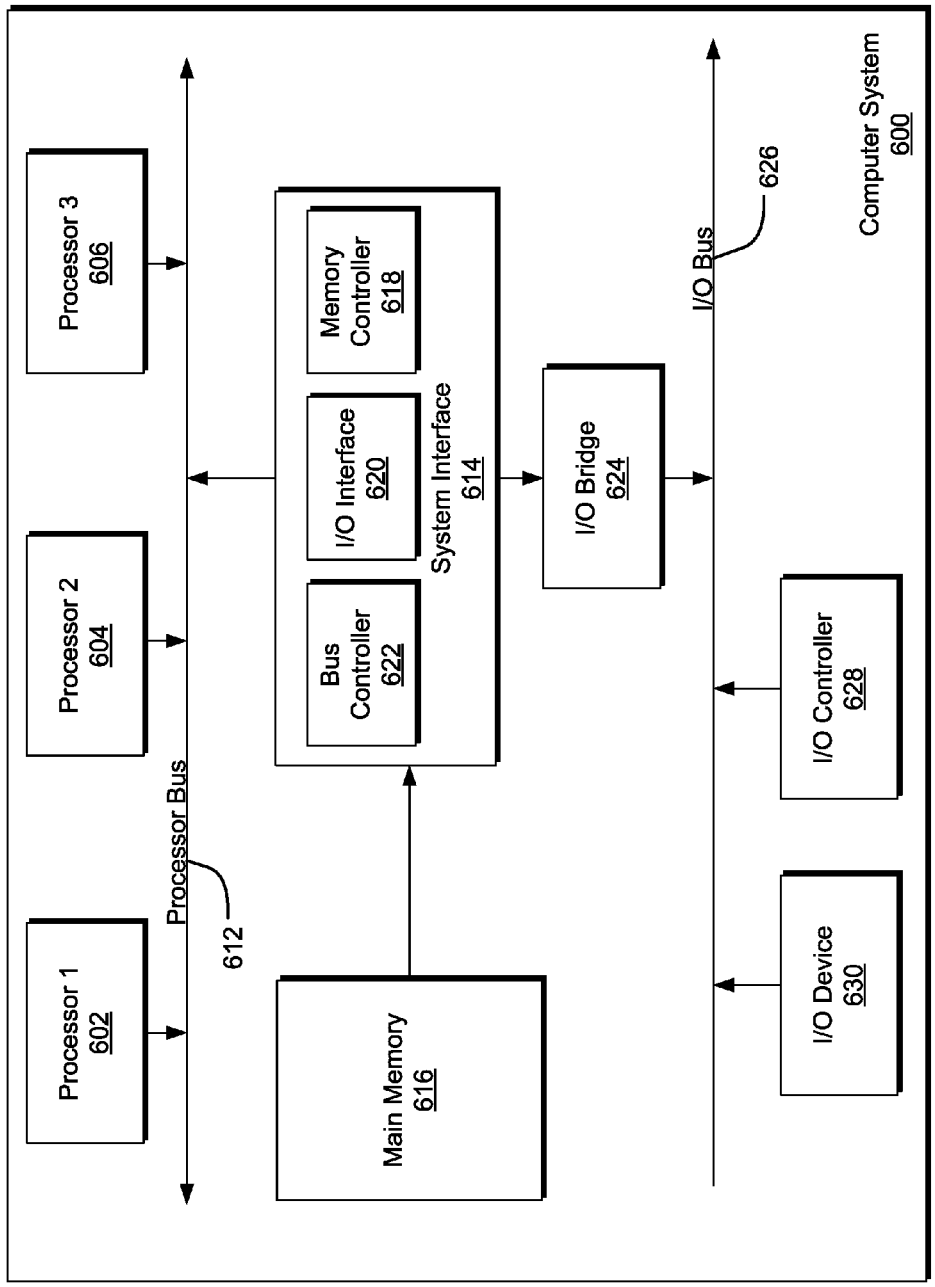
FIG. 6 is a block diagram illustrating an example of a computing system which may be used in implementing embodiments of the present disclosure.

FIG. 6 is a block diagram illustrating an example of a computing device or computer system 600 which may be used in implementing the embodiments of the fabric switch disclosed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIGS. 3 and 5 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for operating a switch fabric of a network, the method comprising:
   maintaining an ordered list of a plurality of input ports of a switch, the list of input ports of the switch ordered based on at least a data queued length to be transmitted out an output port of the switch for each input port, the ordered list comprising an identifier of each of the plurality of input ports and an associated data queued length for each of the plurality of input ports;
   comparing, through a plurality of comparator circuits, an adjusted data queued length of an active input port of the plurality of input ports to each associated data queued length of the plurality of input ports maintained in the ordered list to create a plurality of comparison results indicating a position in the ordered list for insertion of an updated identifier of the active input port, wherein each one of the plurality of comparator circuits receives a data queued length of an associated one of the plurality of input ports and the adjusted data queued length of the active input port such that comparing the adjusted data queued length of the active input port to each associated data queued length of the plurality of input ports occurs simultaneously and within one cycle of a clock signal;
   inserting the updated identifier of the active input port of the plurality of input ports into the ordered list based at least on the plurality of comparison results of the adjusted data queued length of the active input port to each associated data queued length of the plurality of input ports maintained in the ordered list; and
   re-sorting an updated identifier of at least one of the input ports of the plurality of input ports of the switch in the ordered list based at least on the insertion of the updated identifier of the active input port of the plurality of input ports into the ordered list.

2. The method of claim 1 further comprising:
   identifying a relative position in the ordered list of an identifier of at least one of the plurality of input ports of the ordered list prior to inserting the updated identifier of the active input port of the plurality of input ports into the ordered list, wherein the at least one of the plurality of input ports of the ordered list is the same as the active input port of the plurality of input ports.

3. The method of claim 2 further comprising:
   identifying a relative position in the ordered list of insertion of the updated identifier of the active input port of the plurality of input ports into the ordered list.

4. The method of claim 3 further comprising:
   determining a span within the ordered list, the span comprising a numerical representation of a difference of positions within the ordered list between the relative position in the ordered list of the identifier of the at least one of the plurality of input ports of the ordered list and the relative position in the ordered list of insertion of the updated identifier of the active input port of the plurality of input ports into the ordered list.

5. The method of claim 4 wherein re-sorting an updated identifier of at least one of the input ports of the plurality of input ports of the switch in the ordered list comprises:
   moving identifiers within the span up one position in the ordered list when the adjusted data queued length of the active input port of the plurality of input ports is decreased.

6. The method of claim 4 wherein re-sorting an updated identifier of at least one of the input ports of the plurality of input ports of the switch in the ordered list comprises:
   moving identifiers within the span down one position in the ordered list when the adjusted data queued length of the active input port of the plurality of input ports is increased.

7. The method of claim 1 wherein comparing an adjusted data queued length of the active input port of the plurality of input ports to the data queued length to a particular input port maintained in the ordered list provides a low value result when the adjusted data queue length of the active input port is longer than data queued length of the particular input port.

8. The method of claim 7 wherein comparing an adjusted data queued length of the active input port of the plurality of input ports to the data queued length to a particular input port maintained in the ordered list provides a high value result when the adjusted data queue length of the active input port is shorter than data queued length of the particular input port.

9. The method of claim 8 wherein the updated identifier of the active input port is inserted into the ordered list at the position within the ordered list where a transition between a low value result of the plurality of comparison results and a high value result occurs.

10. A network fabric switch comprising:
    a plurality of input/output (I/O) ports, each I/O port configured to receive data packets from a network and transmit data packets to the network; and
    a fabric switch controller comprising:
    a processor; and
    a computer-readable medium associated with the processor and including instructions stored thereon and executable by the processor to configure the fabric switch controller to:
    maintain an ordered list of the plurality of I/O ports, the list of I/O ports ordered based on, for each I/O port, at least a data queued length to be transmitted out one of an output port of the switch, the ordered list comprising an identifier of each of the plurality of I/O ports and an associated data queued length for each of the plurality of I/O ports;
    compare, through a plurality of comparator circuits, an adjusted data queued length of an active I/O port of the plurality of I/O ports to each associated data queued length of the plurality of I/O ports maintained in the ordered list to create a plurality of comparison results indicating a position in the ordered list for insertion of an updated identifier of the active input port, wherein each one of the plurality of comparator circuits receives a data queued length of an associated one of the plurality of I/O ports and the adjusted data queued length of the active I/O port such that comparing the adjusted data queued length of the active I/O port to each associated data queued length of the plurality of I/O ports occurs simultaneously and within one cycle of a clock signal;
    insert the updated identifier of the active I/O port of the plurality of I/O ports into the ordered list based at least on the plurality of comparison results of the adjusted data queued length of the active I/O port to each associated data queued length of the plurality of I/O ports maintained in the ordered list; and
    re-sort an updated identifier of at least one of the I/O ports of the plurality of I/O ports of the switch in the ordered list based at least on the insertion of the updated identifier of the active I/O port of the plurality of I/O ports into the ordered list.

11. The network fabric switch of claim 10, wherein the controller is further configured to:
identify a relative position in the ordered list of an identifier at least one I/O port of the plurality of I/O ports of the ordered list prior to inserting the updated identifier of the active I/O port of the plurality of I/O ports into the ordered list, wherein the at least one of the I/O ports of the plurality of I/O ports of the ordered list is the same as the active I/O port of the plurality of I/O ports.

12. The network fabric switch of claim 11, wherein the controller is further configured to:
identify a relative position in the ordered list of insertion of the updated identifier of the active I/O port of the plurality of I/O ports into the ordered list.

13. The network fabric switch of claim 12, wherein the controller is further configured to:
determine a span within the ordered list, the span comprising a numerical representation of a difference of positions within the ordered list between the relative position in the ordered list of the identifier of the at least one of the plurality of I/O ports of the ordered list and the relative position in the ordered list of insertion of the updated identifier of the active I/O port of the plurality of I/O ports into the ordered list.

14. The network fabric switch of claim 13, wherein the controller is further configured to:
move identifiers within the span up one position in the ordered list when the adjusted data queued length of the active I/O port of the plurality of I/O ports is decreased.

15. The network fabric switch of claim 13, wherein the controller is further configured to:
move identifiers within the span down one position in the ordered list when the adjusted data queued length of the active I/O port of the plurality of I/O ports is increased.

16. The network fabric switch of claim 10 wherein comparing an adjusted data queued length of the active I/O port of the plurality of I/O ports to the data queued length to a particular I/O port maintained in the ordered list provides a low value result when the adjusted data queue length of the active I/O port is longer than data queued length of the particular I/O port.

17. The network fabric switch of claim 16 wherein comparing an adjusted data queued length of the active I/O port of the plurality of I/O ports to the data queued length to a particular I/O port maintained in the ordered list provides a high value result when the adjusted data queue length of the active I/O port is shorter than data queued length of the particular I/O port.

18. The network fabric switch of claim 17 wherein the updated identifier of the active I/O port is inserted into the ordered list at the position within the ordered list where a transition between a low value result of the plurality of comparison results and a high value result occurs.

19. A networking component comprising:
a plurality of ports, each port configured receive data packets from a network and transmit data packets to the network;
a processor; and
a computer-readable medium associated with the processor and including instructions stored thereon and executable by the processor to:
maintain an ordered list of a plurality of input ports of the component, the list of input ports of the component ordered based on at least a data queued length to be transmitted out an output port of the component for each input port, the ordered list comprising an identifier of each of the plurality of input ports and an associated data queued length for each of the plurality of input ports;
compare, through a plurality of comparator circuits, an adjusted data queued length of an active input port of the plurality of input ports to each associated data queued length of the plurality of input ports maintained in the ordered list to create a plurality of comparison results indicating a position in the ordered list for insertion of an updated identifier of the active input port, wherein each one of the plurality of comparator circuits receives a data queued length of an associated one of the plurality of input ports and the adjusted data queued length of the active input port such that comparing the adjusted data queued length of the active input port to each associated data queued length of the plurality of input ports occurs simultaneously and within one cycle of a clock signal;
insert the updated identifier of the active input port of the plurality of input ports into the ordered list based at least on the plurality of comparison results of the adjusted data queued length of the active input port to each associated data queued length of the plurality of input ports maintained in the ordered list; and
re-sort an updated identifier of at least one of the input ports of the plurality of input ports of the switch in the ordered list based at least on the insertion of the updated identifier of the active input port of the plurality of input ports into the ordered list.

20. The networking component of claim 19 wherein the instructions further cause the processor to:
move identifiers within the ordered list up one position when the adjusted data queued length of an active input port of the plurality of input ports is decreased; and
move identifiers within the ordered list down one position when the adjusted data queued length of an active input port of the plurality of input ports is increased.

* * * * *

UNITED STATES PATENT AND TRADEMARK OFFICE
CERTIFICATE OF CORRECTION

PATENT NO. : 10,027,602 B2
APPLICATION NO. : 14/445217
DATED : July 17, 2018
INVENTOR(S) : Srinivasan Page 1 of 1

It is certified that error appears in the above-identified patent and that said Letters Patent is hereby corrected as shown below:

In the Specification

In Column 8, Line 51, delete "FIGS." and insert -- FIG. --, therefor.

Signed and Sealed this
Second Day of April, 2019

Andrei Iancu
*Director of the United States Patent and Trademark Office*